United States Patent [19]

Love

[11] 4,229,067
[45] Oct. 21, 1980

[54] OPTICAL WAVEGUIDE MODE SCRAMBLER

[75] Inventor: Walter F. Love, Horseheads, N.Y.
[73] Assignee: Corning Glass Works, Corning, N.Y.
[21] Appl. No.: 961,663
[22] Filed: Nov. 17, 1978
[51] Int. Cl.³ .............................................. G02B 5/14
[52] U.S. Cl. ............................... 350/96.15; 350/96.31
[58] Field of Search ................ 350/96.15, 96.16, 96.31

[56] References Cited

U.S. PATENT DOCUMENTS

| 3,829,195 | 8/1974 | Rawson | 350/96.18 |
| 3,937,557 | 2/1976 | Milton | 350/96.18 |
| 3,980,391 | 9/1976 | Stewart | 350/96.18 |
| 4,134,639 | 1/1979 | Di Vita | 350/96.15 |
| 4,140,505 | 2/1979 | Ramsay et al. | 350/96.15 |

OTHER PUBLICATIONS

M. Ikeda et al., "Mode Scrambler for Optical Fibers", Applied Optics, vol. 16, No. 4, pp. 1045–1049, Apr. 1977.
M. Eve et al., "Launching Independent Measurements of Multimode Fibers", 2nd European Conf. on Optical Comm. Paris, France (1976), p. 144.
Motokuda et al., "Measurement of Baseband Freq. Response of Mult. Mode Fibre . . . ", Electronics Letters, vol. 13, No. 5, pp. 146–147 )1977).
M. Ikeda et al., "Multimode Optical Fibers, Steady State Mode Exciter", Applied Optics, vol. 15, No. 9, pp. 2116–2120 (1976).
J. P. Hazan et al., "Characterizing Optical Fibers, A Test Bench for Pulse Dispersion, "Philips Tech. Rev., vol. 36, No. 7, pp. 211–216 (1976).

Primary Examiner—Stewart J. Levy
Attorney, Agent, or Firm—Kees van der Sterre; Clinton S. Janes, Jr.

[57] ABSTRACT

An optical waveguide mode scrambler including a length of high-alpha optical waveguide optically coupled to a length of low-alpha optical waveguide which provides efficient spatial and angular mixing of light propagating therethrough is described.

8 Claims, 6 Drawing Figures

4,229,067

OPTICAL WAVEGUIDE MODE SCRAMBLER

BACKGROUND OF THE INVENTION

The present invention is in the field of optical waveguides and principally relates to optical waveguide structures useful as mode scramblers, mode couplers, or the like.

The modal propagation of light in optical waveguides has been discussed by Hicks et al. in U.S. Pat. No. 3,157,726, and by N. S. Kapany in "Fiber Optics—Principles and Applications", Academic Press (1967). As discussed in these and other publications, the propagation of light waves in optical waveguides is governed by laws of physics similar to those that cover microwave propagation in waveguides, and therefore can be studied in terms of modes, each of which has its own propagation and electromagnetic field characteristics.

Single mode waveguides are advantageous in that they are capable of propagating optical signals with very low dispersion, but due to the low numerical aperture and/or small core size of such fibers, it is difficult to efficiently couple optical signals into these waveguides. Multimode waveguides have larger core diameters and/or larger numerical apertures than single mode waveguides. Multimode waveguides are therefore often the preferred medium for the transmission of optical signals since they can accept light from incoherent, broad spectral width sources such as light emitting diodes.

Thousands of modes propagate in multimode optical waveguides, each mode travelling at a slightly different group velocity. A short input pulse that propagates via many guided modes thus splits up into a sequence of pulses that arrive at the output end of the waveguide at different times. This type of pulse dispersion, termed modal dispersion, is the dominant cause of dispersion in typical multimode optical waveguides.

The earliest optical waveguides consisted of a core of uniform refractive index surrounded by a layer of cladding material having a lower refractive index. In this type of waveguide, termed a step-index waveguide, the time required for the various modes to travel a given longitudinal distance along the waveguide increases as the mode order increases. The delay distortion in such a fiber, defined as the difference in the times taken by the fastest and slowest modes to traverse a given waveguide length, is very large, so that the usable bandwidth of the light signal is reduced.

It has recently been recognized that optical waveguides, the cores of which have radially graded index profiles, exhibit significantly reduced pulse dispersion resulting from modal velocity differences. This dispersion-reducing effect, which is discussed in the publication "Multimode Theory of Graded-Core Fibers", D. Gloge et al., Bell System Technical Journal, Pages 1563–1578, November 1973, employs a radially graded, continuous index profile from a maximum value on-axis to a lower value at the core-cladding interface. The index distribution in this type of waveguide is given by the equation:

$$n(r) = n_1[1 - 2\Delta(r/a)^\alpha]^{\frac{1}{2}} \text{ for } r \leq a \quad (1)$$

where $n_1$ is the on-axis refractive index, a is the core radius, $\Delta = (n_1^2 - n_2^2)/2n_1^2$, and $n_2$ is the refractive index of the fiber core at radius a. An optical waveguide of this type, called a graded-index waveguide, exhibits very low modal pulse dispersion when the value of $\alpha$ in the above equation is near 2, and consequently exhibits a much higher usable bandwidth than a step-index waveguide.

A graded-index optical waveguide having an $\alpha$ value on the order of 2, such that the core index depends strongly on core radial position, is an example of a type of waveguide hereinafter referred to as a low-alpha waveguide. An optical waveguide resembling a step-index waveguide, having an invariant core index or a core index varying only slightly with core radius, is an example of a type of waveguide hereinafter referred to as a high-alpha waveguide. In terms of the above equation, a true step-index optical waveguide is taken to be one wherein alpha has an infinite value.

A major difficulty in characterizing the information-carrying capacity or bandwidth of optical fiber waveguides stems from a lack of standardization in the measurement procedure. A fundamental problem arises in relation to the distribution of waveguide modes initially excited by the testing light source. This so-called "launch condition" depends on the angular and spatial distribution of light from a selected source which is initially incident upon the end of the waveguide. In a typical light source such as a semiconductor laser diode, the light issuing from the source and injected into the waveguide core is not uniformly distributed as to injection position or injection angle. The result is that only certain waveguide modes are initially excited by the pulse of light. As a consequence of this nonuniformity, pulse dispersion and the resulting bandwidth value reported for the waveguide will vary strongly depending upon the particular light source selected for testing and the core location at which the light pulse is injected into the waveguide.

A proposed solution to the problem of bandwidth measurement reproducibility is to utilize a mode scrambler, also called a mode mixer, which mixes or mode-couples light passing into or through a waveguide so that a more uniform spatial and angular distribution of light proceeds down the waveguide core. Among the mode scramblers utilized in the prior art are those which rely on microbending-induced mode coupling effects, such as the mode scrambler described by M. Ikeda et al. in *Applied Optics*, Vol. 16, No. 4, Pages 1045–1049 (1977), or the mode scrambler described by M. Eve et al. at the Second European Conference on Optical Communications, Tour Olivier de Serres, Paris, 1976, Part 2, Communication V.3.

A mode scrambler utilizing sinusoidal fiber bending is discussed by M. Tokuda et al. in *Electronics Letters*, Vol. 13, No. 5, pp. 146–147 (1977), and a mode exciter incorporating an etched fiber end is described by M. Ikeda et al. in *Applied Optics*, Vol. 15, No. 9, Pages 2116–2120 (1976). J. P. Hazan et al. suggest the use of a step-index fiber as a "distributed ray scrambler" in the *Philips Technical Review*, Vol. 36, No. 7 (1976) at page 213.

In general, mode scramblers utilizing microbending coupling or etched end diffusion effects present problems of device reproducibility, whereas most other scrambler configurations are cumbersome and inconvenient to use.

SUMMARY OF THE INVENTION

In accordance with the present invention, it has been found that a high degree of mode mixing is provided by an assembly which includes a length of high-alpha waveguide spliced to a length of low-alpha waveguide.

The high-alpha waveguide, which can be a step-index type waveguide having a relatively invariant core index, acts to diffuse the spatial intensity distribution of light passing therethrough, whereas the low-alpha, graded-index waveguide diffuses the angular intensity distribution of propagated light. For the purpose of the present description, a high-alpha waveguide is a waveguide wherein alpha is in the range of about 10 to ∞ and a low-alpha waveguide is a waveguide wherein alpha is in the range of about 2–4, when the refractive index profile of the waveguides is best fit by the index distribution equation (1) above set forth. Coupling of these waveguides may be achieved using any of the known splicing techniques which do not result in unacceptable coupling losses.

The described mode-mixing effect resulting from the coupling of waveguides of widely differing alpha values can be used to substantially improve the light-launching characteristics of laser diodes or other sources commonly employed for optical waveguide bandwidth measurements. Alternatively, the effect can be used to achieve mode scrambling at a selected point in a waveguide link where the mixing of light modes being propagated through the link is desired.

In a specific embodiment, a mode scrambler suitable for use such as described may include a section of high-alpha or step-index optical waveguide optically coupled to a section of low-alpha or graded index optical waveguide. The step-index waveguide should circularize and smooth the near-field emission pattern of the light source, and must therefore be of a length sufficient to allow several light reflections at the core-cladding boundary (typically several millimeters). The graded index waveguide should provide angular mixing of the source far-field emission pattern, and must therefore encompass several light focusing lengths (again typically several millimeters). Lengths on the order of about one meter for both the step-index and graded index waveguide sections provide excellent results. Much longer lengths may be used without degrading mixing behavior, but are preferably avoided to reduce pulse spreading and attenuation by the scrambler.

A mode scrambler thus provided may be used to modify the light distribution characteristics of a laser source to be used for bandwidth measurements, for example, by coupling the step-index waveguide section to the laser source and the graded index waveguide section to the waveguide to be measured. In contrast to the direct output of the laser source, which tends to launch light into a relatively limited number of waveguide propagation modes, the mode scrambler emits a signal providing very uniform modal excitation in a waveguide to be tested.

BRIEF DESCRIPTION OF DRAWING

The invention may be more fully understood by reference to the appended drawings wherein:

FIG. 3a represents the effect of light source movement on measured bandwidth values for a typical wide-bandwidth optical waveguide, utilizing a non-uniform laser light source such as shown in FIG. 2a;

DETAILED DESCRIPTION

Figure 1:
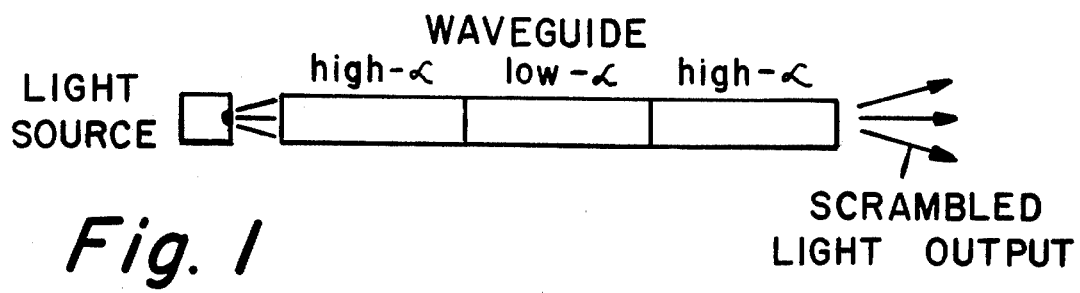
FIG. 1 represents a preferred embodiment of a mode scrambler provided in accordance with the present invention.

In a preferred embodiment, the invention comprises an optical waveguide mode scrambler which includes three coupled sections of optical waveguide, including a central section of graded index (low-alpha) waveguide optically coupled to two terminal sections of step-index (high-alpha) waveguide. A mode scrambler of this type is schematically illustrated in FIG. 1 of the drawing.

As a specific example, a device of the type shown in FIG. 1 is provided using two terminal sections of multimode step-index waveguide having a diameter of 150 microns, a core diameter of 100 microns, a cladding refractive index of 1.458, and a numerical aperture of about 0.3. The central section of the device consists of a length of multimode graded index waveguide having a diameter of 150 microns, a core diameter of 100 microns, a cladding refractive index of 1.458, a numerical aperture of 0.3, and an alpha value of about 4. Each of these waveguide sections is about 1 meter in length, and is coupled into the device using fusion splices to form the completed scrambler assembly. These fusion splices of themselves cause little mode conversion and exhibit low loss. Hence the insertion loss of a three-section device such as described has been measured at about 1.5 dB.

The launch modal distribution of a light source for optical waveguide bandwidth measurements may be characterized by measuring the far-field angular intensity distribution for light launched by the source into a short (2 meter) test length of graded index optical waveguide under bandwidth measuring conditions. Subnanosecond light pulses from a pulsed GaAs laser diode are injected into such a test length and detected in the far-field region using a sampling oscilloscope, the output of which is integrated and recorded as a function of angle. Such a pattern is shown for the case of the laser diode alone in FIG. 2a of the drawing. The diode is directly coupled to the input of the test length at a position to maximize the total intensity of guided light. The pattern suggests that this laser source launches primarily low-order modes into the test length.

Figure 2A:
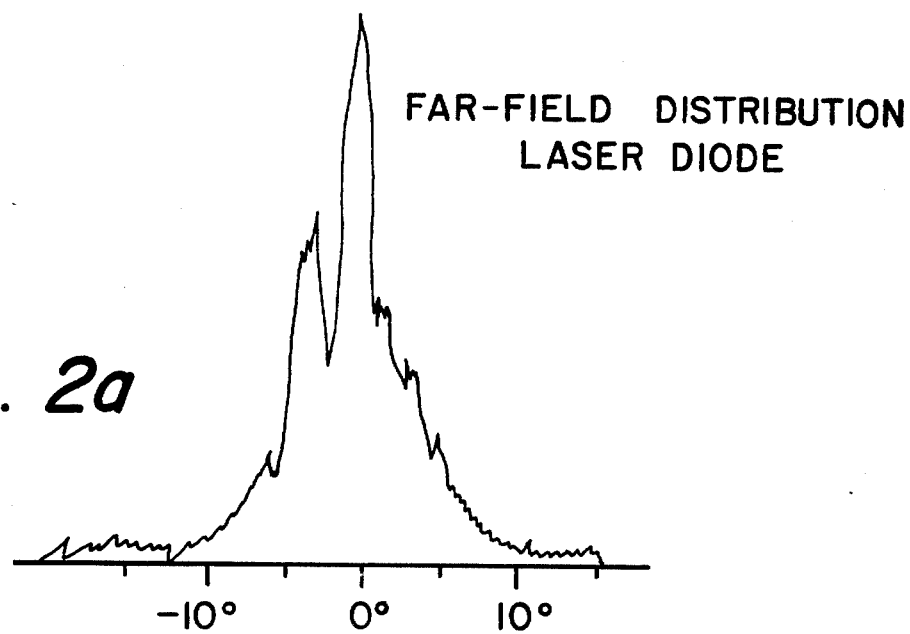
FIG. 2a represents the far-field light intensity distribution pattern of a typical laser diode light source used for optical waveguide bandwidth measurements after propagation through a 2-meter length of graded index waveguide.
Figure 2B:
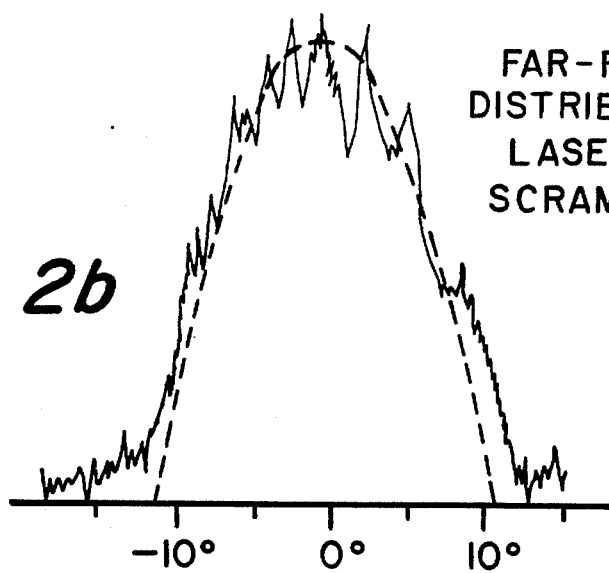
FIG. 2b represents the far-field light intensity distribution pattern for the laser source of FIG. 2a after mode mixing and propagation through the same 2-meter length of graded index waveguide.

In FIG. 2b of the drawing, the same laser diode is coupled directly to a three-section mode scrambler such as above described, and the scrambler output is optically coupled to the test length by imaging onto the test length core using lenses. The output of the test length is shown on the same angular scale as in FIG. 2a, and output from the test length using a Lambertian source is superimposed in the scrambled laser output as a broken line. In contrast to the direct laser source, the scrambled laser source exhibits improved angular uniformity and adequately fills the modal volume of the test fiber.

The effects of more uniform modal excitation on the accuracy and precision of the bandwidth measurement in actual waveguides are demonstrated by repeated bandwidth measurements taken on a single length of typical graded index optical waveguide with and without the insertion of the mode scrambler. The light source for these measurements is the pulsed GaAs laser diode characterized in FIG. 2a of the drawing. The radial position of the light source is shifted to each of five different measurement positions on the core of the graded index optical waveguide under test (or the core of the mode scrambler) to determine the effects of source positional variations on the bandwidth measurement. This test reproduces measurement variations which could result from misalignment by a test operator in production, or from variations in light source near field emission pattern.

Figure 3A:
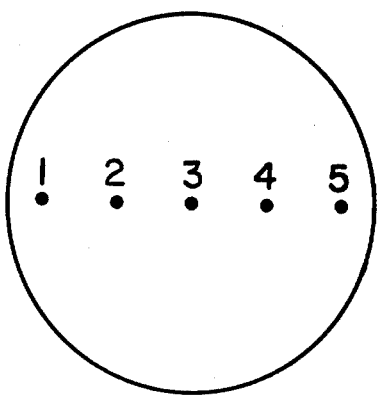

FIG. 3a of the drawing represents the results of five measurements for the case of the unscrambled laser light source shown in FIG. 2a, coupled directly to the graded index waveguide. The core of the waveguide is represented by the circle in the drawing, and the five measurement positions by the spots positioned along the diameter of the core. The measured bandwidth values for each source position are reported in megahertz, along with the mean bandwidth value and standard deviation for the five measurements.

Figure 3B:
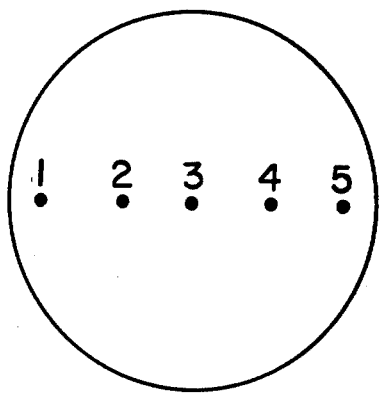
FIG. 3b represents the effect of light source movement on measured bandwidth values for the same optical waveguide, utilizing the scrambled laser light source having the characteristics shown in FIG. 2b.

The bandwidth measurements reported in FIG. 3a may be contrasted with the same values reported in FIG. 3b, which are for the case where a three-section mode scrambler such as above described is inserted between the pulsed laser source and the waveguide under test. In this case, the position of the source is varied on the core of the step-index mode scrambler input. Again, the core of the mode scrambler is represented by the circle, and the five measurement positions by the spots spaced along the diameter of the core. It is evident from the bandwidth values reported in FIG. 3b that the use of the mode scrambler has significantly increased the precision of the bandwidth measurement against launch condition changes. Equally precise measurements have been obtained using other laser diode light sources.

In practice, variances resulting from light source misalignment may be avoided by providing a full mode light launching assembly for optical waveguide testing which comprises a light source such as a laser diode optically coupled in semipermanent fashion to a mode scrambler such as the three-section mode scrambler hereinabove described. With this assembly, launch condition changes can only be effected by misaligning the assembly output with the core of the optical waveguide to be tested.

Figure 4:
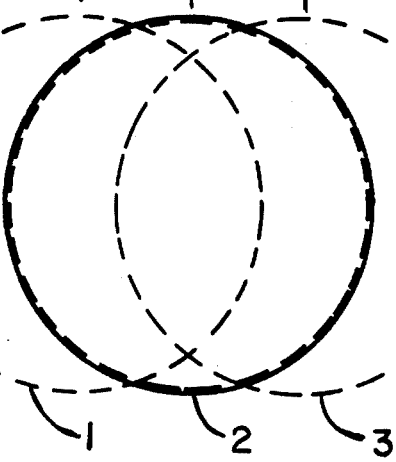
FIG. 4 represents the effect of scrambler movement on the bandwidth measurement of a typical optical waveguide.

It is found that the effects of such misalignment on the bandwidth measurement are small. FIG. 4 of the drawing reports data for three separate bandwidth measurements taken on a single optical waveguide using three different alignments of the scrambler output to the optical waveguide core. In FIG. 4, the optical waveguide core position is represented by the solid circle, and the three scrambler core positions by the broken circles. Thus measurements are taken under the condition of direct core-to-core alignment and at positions offset 25 microns to either side of the optical waveguide core axis.

The optical waveguide bandwidth values for each of the three scrambler positions are reported in megahertz in the drawing table. It is evident from this data that, with scrambler misalignment of the magnitude shown, which is believed to be well within the limits of operator misalignment which would be encountered in production testing, no detectable changes in the value of the measured bandwidth are observed.

The simplicity of design inherent in a mode scrambler provided as above described affords device repeatability not characteristic of other mode scrambling devices utilized in the prior art. Hence, several devices of the kind above described have been fabricated and tested, and shown to be effective in promoting close agreement in bandwidth measurement among different measurement systems. A standardized input modal distribution, approximating a steady-state modal distribution, may readily be provided from such devices using conventional spatial and angular filtering techniques.

I claim:

1. An article of manufacture which includes a high-alpha optical waveguide spliced to a low-alpha optical waveguide, the length of the low-alpha optical waveguide being at least sufficient to obtain angular diffusion of light launched therein.

2. An optical waveguide mode scrambler which includes a section of high-alpha optical waveguide optically coupled to a section of low-alpha optical waveguide, the length of the high-alpha waveguide being at least sufficient to provide spatial diffusion of light launched into the waveguide, and the length of low-alpha waveguide being at least sufficient to obtain angular diffusion of light launched into the waveguide.

3. An optical waveguide mode scrambler in accordance with claim 2, wherein the high-alpha optical waveguide is a step-index waveguide.

4. An optical waveguide mode scrambler in accordance with claim 2, wherein the low-alpha optical waveguide is a graded index waveguide having an alpha value of about 2.

5. An optical waveguide mode scrambler which includes at least three optically coupled sections of multimode optical waveguide, including a central section of low-alpha optical waveguide having a length at least sufficient to provide spatial diffusion of light launched therein, and first and second terminal sections of high-alpha optical waveguide spliced, respectively, to first and second ends of said low-alpha optical waveguide, said first and second terminal sections having lengths at least sufficient to provide angular diffusion of light launched therein.

6. An optical waveguide mode scrambler in accordance with claim 5 wherein the high-alpha optical waveguide is step-index optical waveguide.

7. An optical waveguide mode scrambler in accordance with claim 5, wherein the sections of optical waveguide have lengths on the order of 1 meter.

8. A full-mode light launching assembly for optical waveguide testing which comprises a light source optically coupled to a mode scrambler, wherein the mode scrambler includes a section of high-alpha multimode optical waveguide optically coupled to a section of low-alpha multimode optical waveguide.

* * * * *